United States Patent [19]

Väisänen

[11] Patent Number: 4,936,592
[45] Date of Patent: Jun. 26, 1990

[54] TIGHTENING ARRANGEMENT FOR PACKING RINGS OF A PACKING BOX

[75] Inventor: Kalevi Väisänen, Karhula, Finland

[73] Assignee: A. Ahlstrom Corporation

[21] Appl. No.: 197,996

[22] Filed: May 24, 1988

[30] Foreign Application Priority Data

Jun. 2, 1987 [FI] Finland .................. 872447

[51] Int. Cl.⁵ .............................. F16K 41/02
[52] U.S. Cl. ............................ 277/64; 277/105
[58] Field of Search .................. 277/104–106, 277/112, 138, 147, 148, 165, 167.3, 193, 60, 64; 403/43, 336, 337

[56] References Cited

U.S. PATENT DOCUMENTS 1,475,993 12/1923 Harris et al. ............. 277/105 X
1,757,311  5/1930 Kahle ...................... 277/106 X
4,765,631  8/1988 Kohnen et al. ............ 277/106 X

FOREIGN PATENT DOCUMENTS 853995 12/1952 Fed. Rep. of Germany.
3510422  9/1986 Fed. Rep. of Germany.
11463  1/1903 Norway.

Primary Examiner—Allan N. Shoap
Assistant Examiner—Scott W. Cummings
Attorney, Agent, or Firm—Toren, McGeady & Associates

[57] ABSTRACT

The present invention relates to a sealing arrangement for sealing a rotary shaft by means of several adjacent ring-type packings arranged in a packing box. The disadvantage of known arrangements is that, in box-type sealings, only the packing rings disposed nearest to the clamping element are clamped effectively. In the arrangement of the invention, an intermediate gland (11) is arranged between packing rings (8, 9) and said intermediate gland is forced to move to the left while the screws (13) are being screwed up. The desired effect is achieved by providing the ends of each screw (13) with divergent threads (16, 17), which are provided with an unequal or equal pitch.

2 Claims, 2 Drawing Sheets

TIGHTENING ARRANGEMENT FOR PACKING RINGS OF A PACKING BOX

The present invention relates to a new type of sealing arrangement for rotary shafts. The arrangement facilitates clamping of cord or other packings either equally tight or in a desired proportion to each other. The arrangement is especially suitable for sealing the shafts of centrifugal pumps.

In the most common of previously known arrangements with cord packings as disclosed in, for example, DE patent application 3510422, cord packings are pressed in their boxes by means of sealing glands secured with screws. Usually, there are 4 to 6 cord layers or packing rings, and it is well known that those positioned closest to the sealing gland are the only ones subject to effective clamping impact. For example, a study made with a six-layer packing indicated that the last or most remotedly situated packing ring in the packing box was only subject to a fraction of the total clamping pressure of the gland. The reason for that was naturally friction against both the packing box wall and the shaft. Sooner or later, this results in burn-up of the sealing and increase in the leakage.

In said DE patent application, the problem has been attempted to be solved by dividing an ordinary cord packing into two packings, both comprising three packing rings. The clamping has improved a little, but the arrangement is complicated and both sealing glands have to be clamped with screws of their own.

Corresponding arrangements have been disclosed since the beginning of the century. For example, NO patent specification 11463 and DE patent specification 853995 disclose an arrangement in which clamping is effected with the same bolts, but both sealing glands have clamp nuts of their own. The danger of such arrangements is that they may leave the most remotedly situated sealings slack or, on the other hand, these may become overclamped because, while the sealings deeper in the box are clamped, the frictional forces of the countersurfaces of the sealings nearer the outer surface of the box have to be exceeded, and one has no clear feel of the tightness of the sealings themselves that are being clamped.

Since the arrangements described above have not been entirely reliable, the users have continued to employ the existing methods, in which the packing is composed of a number of packing rings adjacent to each other or separated from each other by a cooling ring only. The cooling ring often becomes rusty, oxidized or has otherwise become stuck in the packing box so as not to move at all when the packing rings have been clamped. As a result, the most remotedly situated packing rings have remained slack and, if the packing rings have been clamped trusting that all of them will be compressed, as they are supposed to, the packing rings nearer the surface have become overclamped, which has resulted in fast wear and burn-up.

The arrangement of the present invention eliminates or minimizes the above-mentioned problems because all packing rings are clamped by the same clamping screws even if the packing rings are divided into several groups. At the same time a cooling ring, if any, is forced loose.

The arrangement of the invention is characterized in that an intermediate gland or intermediate glands dividing the packing rings into several groups is/are arranged so as to be forced to move while the screws clamping the sealing gland are being unscrewed or screwed up.

The present invention will be described further in greater detail and by way of example, with reference to the accompanying drawings, in which.

Figure 1:
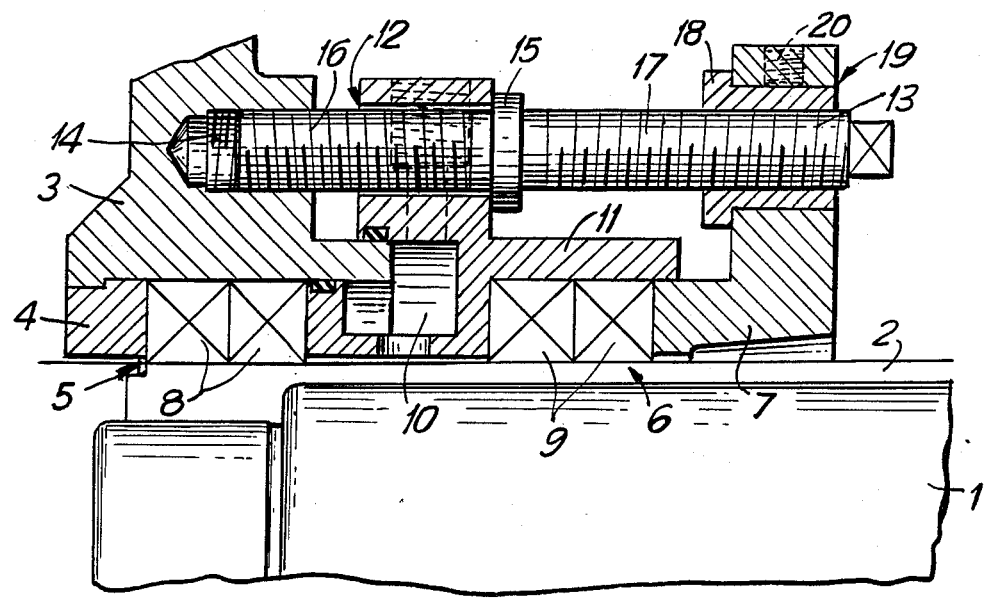
FIG. 1 is a half cross-sectional illustration of an arrangement forming a preferred embodiment of the invention.
Figure 2:
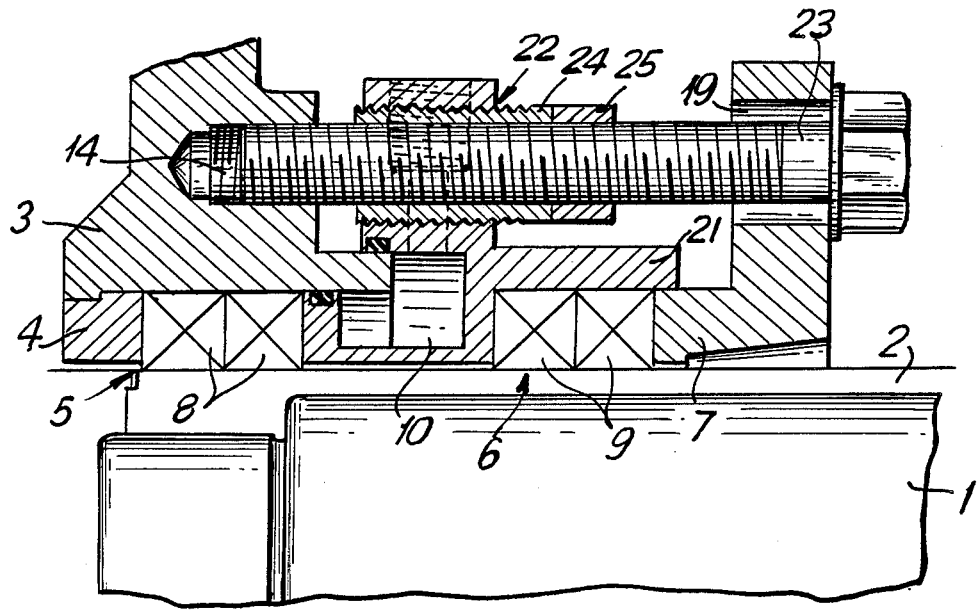
FIG. 2 is a half cross-sectional illustration of an arrangement forming a second embodiment.

Parts common to FIGS. 1 and 2 are a rotary shaft 1, a shaft sleeve 2, a body 3, a bottom ring 4, a first packing box 5, a second packing box 6, a sealing gland 7 and packing rings 8 in the box 5 and packing rings 9 in the box 6. Furthermore, a part common to both figures is a cooling space 10, which in itself is in no way related to the invention, but it indicates that the intermediate gland, which is an essential part of the invention, is capable of performing other tasks as well. Sealing liquid (FIG. 1) or cooling liquid (FIG. 2) is led to the cooling space 10 directly through threaded connections in a part 11 or 25.

In FIG. 1, the packing rings 8 and 9 are separated by an intermediate gland 11, which not only forms the above-mentioned cooling space 10 but also the second packing box 6, where packing rings are pressed in place by the sealing gland 7. The outer rim of the intermediate gland 11 is provided with unthreaded holes 12 for clamping screws 13 (only one shown). At a corresponding distance from the shaft, the body 3 is provided with threaded holes 14 having an axial dimension such that the clamping screws 13 can advance into the holes 14 upon being screwed up. The middle of the screws 13 is provided with a shoulder 15, which abuts on the end walls of the holes 12 in the intermediate gland 11. Furthermore, the ends of the screws 13 are, in accordance with a preferred embodiment, provided with divergent threads 16 and 17 having an equal or unequal pitch. The threaded section 17 of the screws 13 is provided with flanged sleeves 18 that match the holes 19 in the sealing gland 7.

The installation and clamping of the packings is described in the following. The packing rings 8 are installed in their box 5 and pre-clamped in place by means of the intermediate gland 11 and the clamping screws 13 screwed in the holes 14. The shoulder 15 of the screws transmits the clamping force to the intermediate gland 11. Thereafter, the packing rings 9 are installed in their box 6 in the intermediate gland 11. The flanged sleeves 18 are wound onto the threads 17 of the clamping screws 13 and the sealing gland 7 is pushed in place to a preliminary tightness, whereafter the flanged sleeves are locked in place by a retaining screw 20 and wound against the sealing gland. If the sealing gland 7 is divided into sections, the sleeves 18 are locked in the holes 19 by friction force when the sealing gland 7 is assembled. After that, when the clamping screws 13 are screwed up into the holes 14, both groups of packing rings become clamped in their boxes 5 and 6 as determined by the threads 16 and 17. For example, if the screw pitch of the thread 16 is a mm and that of the thread 17 is 2a mm and the threads are opposite in direction, the intermediate gland 11 will move a mm to the left when the screw 13 is screwed a turn, which correspondingly compresses the packing ring 8 by a total of a mm. At the same time, the sealing gland 7 moves in the same direction by 3a mm and the packing rings 9 will thus slide a mm to the left on the shaft sleeve as a result of the transfer of the intermediate gland 11 and will also be compressed by 2a mm. Thus, for example, if different boxes of the packing rings are for some reason different in size or in number, and the clamping ranges should be unequal, this can be allowed for by adjusting the pitch ratio of the threads 16 and 17 of the clamping screws according to need.

A second, alternative embodiment is shown in FIG. 2 where correspondingly there is an intermediate gland 21 between the packing rings 8 and 9, which gland is provided with threaded holes 22 fitted with sleeves 24 that are threaded inside and out, which again are mounted on about clamping screws 23. According to a preferred embodiment, the screws 23 are screwed in threaded holes 14 of the body 3. The sealing gland 7 is provided with holes 19 for the clamping screws 23. Furthermore, the screws 23 are equipped with a shoulder between the sealing gland 7 and the intermediate gland 21 or with a sleeve 25 locked at the screw, supporting the sleeve 24.

The apparatus operates in such a way that, while the clamping screws 23 are being screwed up, the sealing gland 7 moves straight to the left by a distance determined by the pitch of the threaded holes 14. An objective of the threaded flange 24 is to curtail the movement of the intermediate glands 21, or in another words, to move the intermediate gland 21 to the right relative to the clamping screw. This is accomplished by arranging the sleeve 24 with internal and external threads opposite in direction in such a way that the pitch of the external threads is lower than that of the internal threads. While the screws 23 are being screwed up, the sleeves 24, being supported by the shoulder or sleeves 25, rotate with the screw 23.

Figure 3:
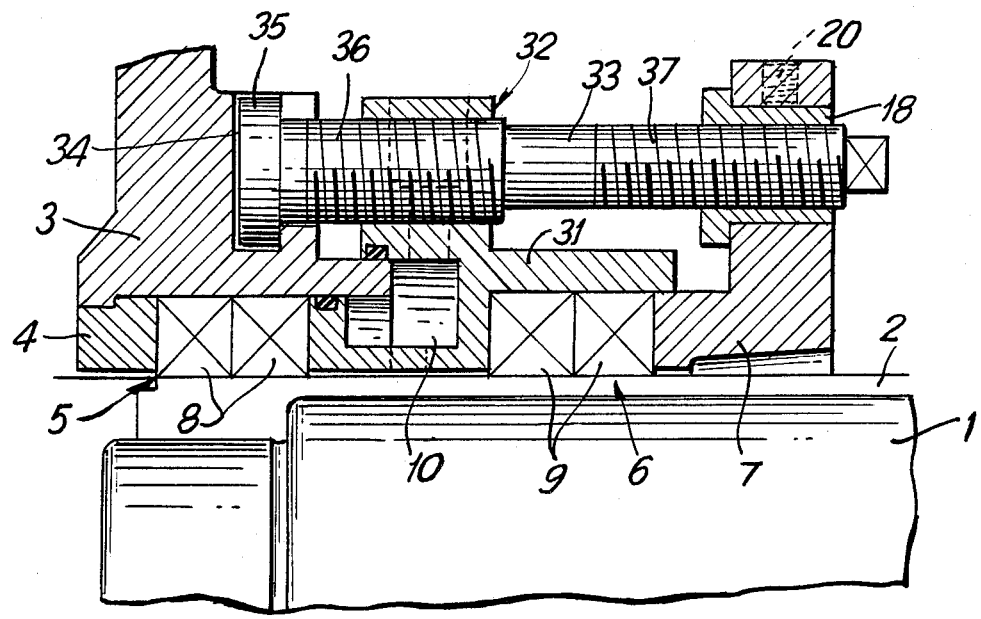
FIG. 3 is a half cross-sectional illustration of an arrangement forming a third embodiment of the invention.

A third, alternative embodiment is an arrangement illustrated in FIG. 3, with an intermediate gland 31 between the packing rings 8 and 9, said gland being provided with threaded holes 32. The sealing gland 7 and flanged sleeves 18 installed in the holes of the sealing gland correspond to the arrangement as shown in FIG. 1. In comparison with other figures, there is a difference in the screw 33 and in its fixation with the body 3 and connection with the intermediate gland 31. The screw 33 comprises an end flange 35 disposed in a groove 34 machined in the body 3, a threaded section 36 and 37 and a spoke at the end of the screw. The threads of the sections 36 and 37 are parallel but they have unequal pitches. The pitch of the threaded section 36 is lower than that of the section 37. The apparatus operates in such a way that, while the screw 33 is being screwed up at the threaded section 36, the intermediate gland 31 arranged with threaded holes 32 will move in the desired direction by a distance determined by the pitch.

Likewise, the threaded connection between the threaded section 37 and the flanged sleeve 18 transfers the sealing gland 7 in a desired direction by a distance determined by the pitch. Thus, if equal compression on both packing rings 8 and 9 is required, the pitch of the threaded section 37 has to be double relative to the pitch of the threaded section 36.

As described in FIGS. 1, 2 and 3, the intermediate gland 11, 21, 31 can also serve as a cooling ring (FIG. 2) or as a sealing liquid ring (FIG. 1) when cooling liquid is led into it. In this case the intermediate gland must naturally be sealed, for example, as shown in the figures. Even if such a cooling ring were stuck in the packing box for some reason or another, it would be forced loose by the clamping method of the invention, whereby all packing rings will be evenly clamped.

It is, however, worth noticing that the above description only discloses three preferred embodiments of the arrangement of the invention. Although the figures illustrate a division of the packing rings into two groups, it is possible to divide them into more groups and adjust clamping of each group according to need by means of the pitch. Correspondingly, packings can be clamped in other ways as well. Those methods are, however, based on the inventive scope of the embodiments described above and that inventive scope is defined in the accompanying claims.

I claim:

1. A tightening arrangement for sealing a rotary shaft, comprising:
 a first packing box;
 successive packing rings;
 at least one displaceable intermediate gland arranged so as to separate said packing rings into at least two groups, said intermediate gland forming a first sealing grand arranged so as to abut a first group of packing rings located in said first packing box, and a second packing box in which a second group of packing rings is located;
 a second sealing gland arranged so as to abut said second group of packing rings; and
 clamping screws arranged so as to displace both said at least one intermediate gland and said second sealing gland so as to effect clamping of the packing rings in each packing box, each of said screws having two sections of threads with said section of threads opposite in direction, portions of pitches of the sections determining the actual tightness of each group of packing rings, a shoulder being provided between the sections so as to support at least one intermediate gland.

2. A tightening arrangement as defined in claim 1, and further comprising a body provided in said first packing box and having a threaded hole to match one of the threaded sections of each of said screws and flanged sleeves provided so as to move said sealing gland and each having a threaded hole to match the threaded section of each of said screws.

* * * * *